United States Patent [19]
Pozzoli

[11] Patent Number: 6,092,653
[45] Date of Patent: Jul. 25, 2000

[54] METHOD FOR MANUFACTURING CASES FOR COMPACT DISCS AND THE LIKE

[75] Inventor: Aldo Pozzoli, Inzago, Italy

[73] Assignee: Pozzoli S.p.A., Inzago, Italy

[21] Appl. No.: 09/471,091

[22] Filed: Dec. 23, 1999

[30] Foreign Application Priority Data

May 10, 1999 [IT] Italy ................................. MI99A1013

[51] Int. Cl.$^7$ ................................................. B65D 85/30
[52] U.S. Cl. ............................... 206/312; 493/56; 493/83
[58] Field of Search ................................. 493/52, 56, 82, 493/83, 162, 342; 206/311, 312, 313, 232, 308.1

[56] References Cited

U.S. PATENT DOCUMENTS 5,697,499 12/1997 Reiter ....................................... 206/312
5,769,216 6/1998 Collins ................................. 206/312 X

*Primary Examiner*—Jacob K. Ackun
*Attorney, Agent, or Firm*—Guido Modiano; Albert Josif; Daniel O'Byrne

[57] ABSTRACT

A method for manufacturing cases for compact discs, comprising the steps of: providing a sheet-like element which forms a base element, at least one first intermediate element with a pre-cut line which delimits a containment seat, and at least one covering element with a pre-cut line which delimits an opening with a retaining edge. Folding lines are provided between the elements. The sheet-like element is folded by superimposing the first intermediate element on the base element, gluing the contact surface that is external to the containment seat; then the covering element is folded onto the first element, gluing the entire mutual contact surface; then the peripheral edges of the folded elements are trimmed; the portions delimited by the pre-cut lines are then removed in order to free the disc containment seat; and a containment cover is applied.

8 Claims, 4 Drawing Sheets

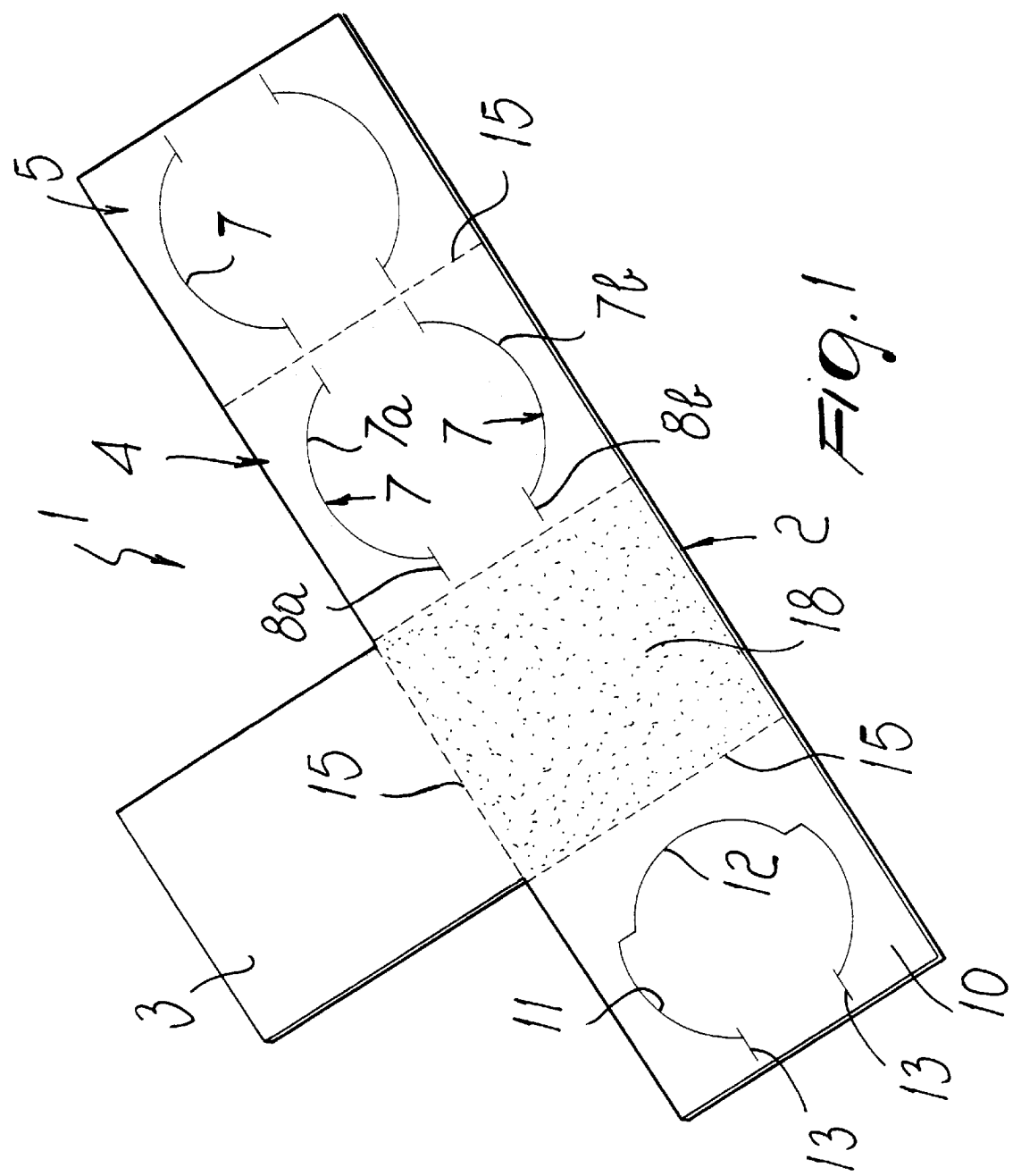

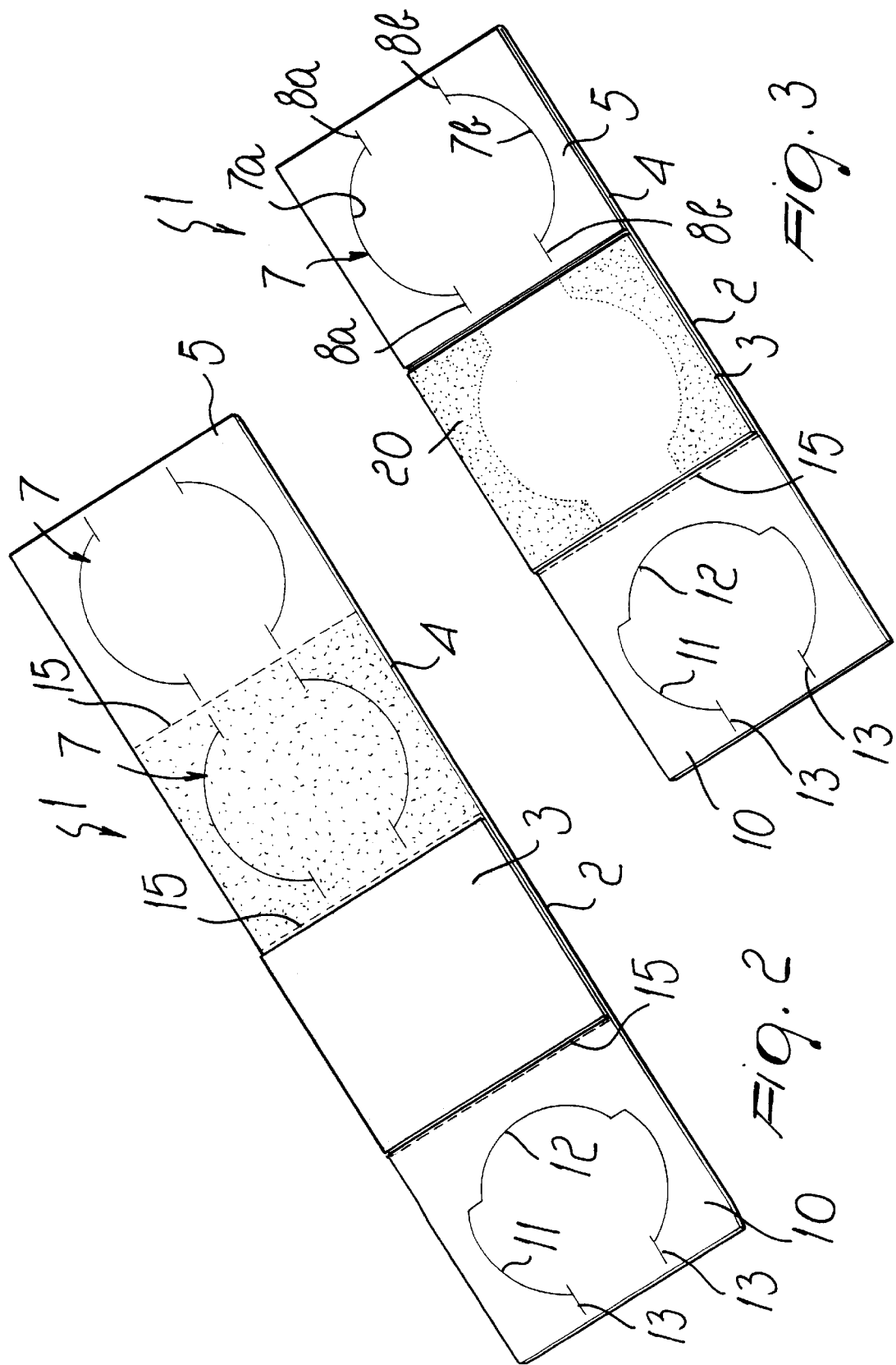

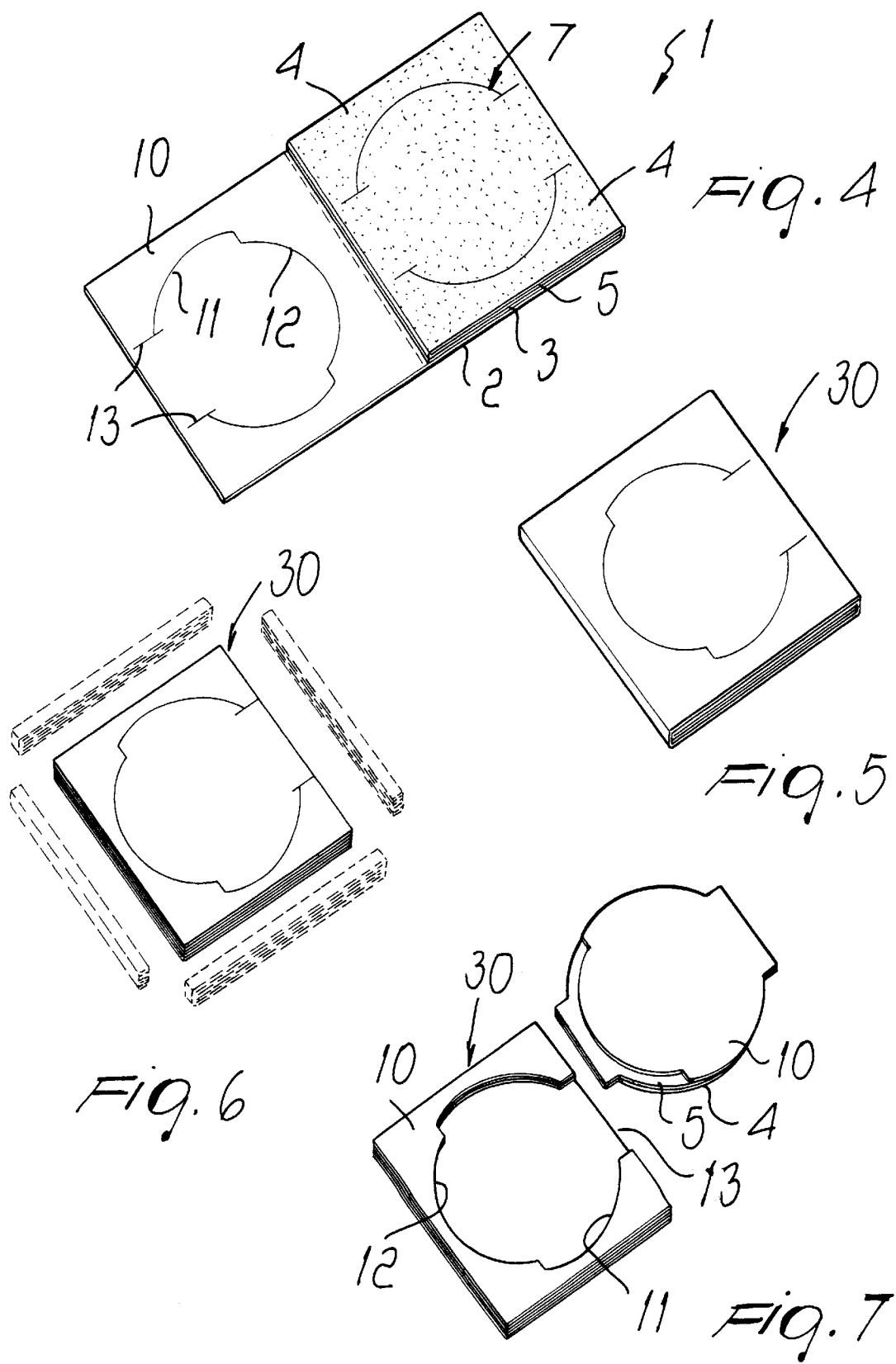

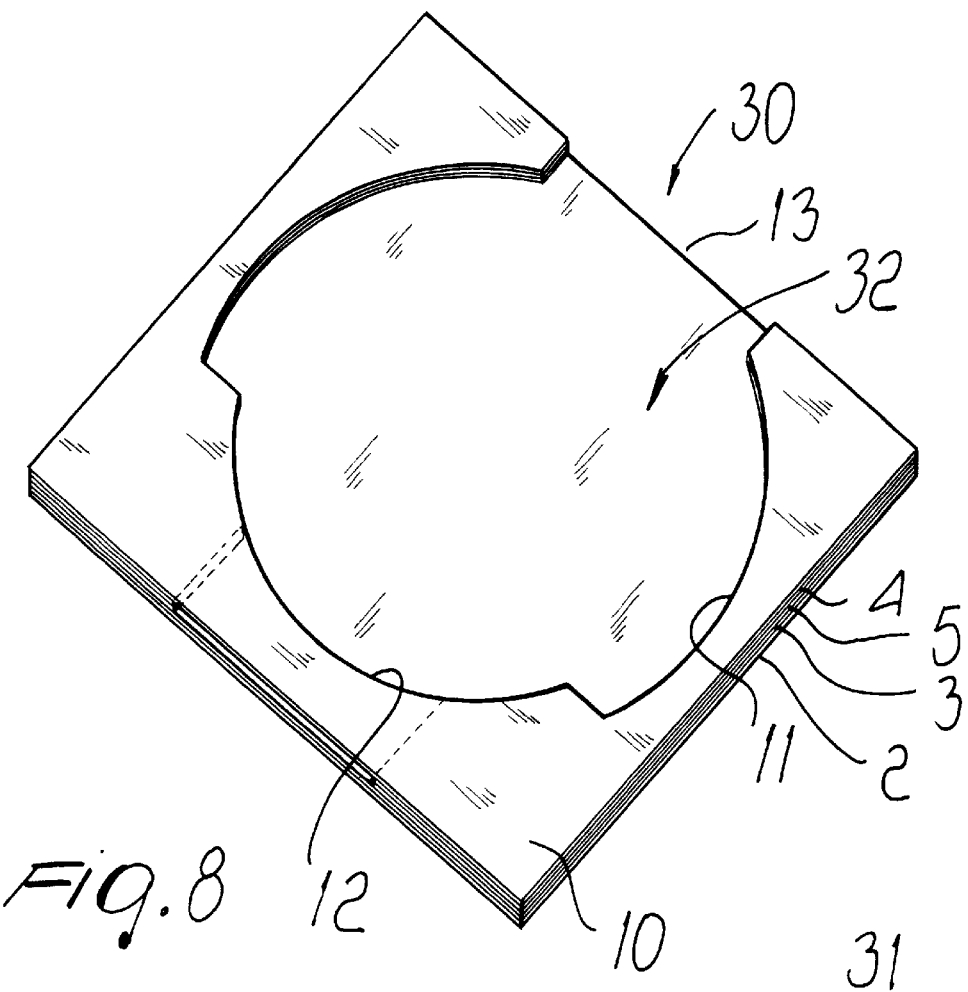
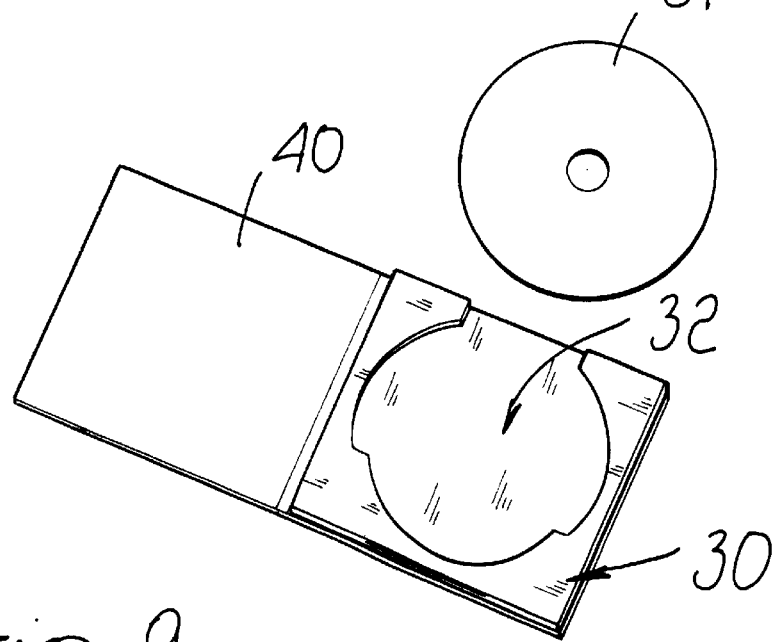

METHOD FOR MANUFACTURING CASES FOR COMPACT DISCS AND THE LIKE

BACKGROUND OF THE INVENTION

The present invention relates to a method for manufacturing cases for compact discs and the like.

It is known that cases for compact discs and the like made of natural materials such as for example cardboard, which allows full recycling, are becoming increasingly popular.

The problem that is encountered is to be able to maintain the same external dimensions as cases made of plastics; accordingly, it is currently necessary to provide recesses for containing the compact disc which are formed by means of layers of cardboard which are constituted by pieces arranged on opposite edges of the central region for containing the disc.

With the dimensions that it is necessary to use, it is not possible to provide a single layer, since the portions connecting the two pieces would be too small and would not be strong enough.

This fact leads to several drawbacks, the foremost being that it is necessary to superimpose a plurality of layers which are usually produced with a relatively high thickness in order to reduce the operations required and therefore it is not possible to subject the piece to conventional printing operations because it is too thick.

SUMMARY OF THE INVENTION

The aim of the present invention is to eliminate the above-noted drawbacks, by providing a method for manufacturing cases for compact discs and the like which allows to considerably simplify the operating steps of the manufacture of the case, allowing to obtain a disc containment region which is given its shape without having to resort to the coupling of pieces as instead occurs in the prior art.

Within the scope of this aim, a particular object of the present invention is to provide a method which allows to use thinner cardboard by way of the possibility to easily form a plurality of layers, consequently allowing to perform ordinary printing operations and thus making the aesthetics of the assembly much more pleasant.

Another object of the present invention is to provide a method which, thanks to its particular constructive characteristics, is capable of giving the greatest assurances of reliability and safety in use.

Another object of the present invention is to provide a method for manufacturing cases for compact discs and the like which can be easily obtained starting from commonly commercially available elements and materials and is also competitive from a purely economical point of view.

This aim, these objects and others which will become apparent hereinafter are achieved by a method for manufacturing cases for compact discs and the like, according to the invention, comprising the steps of: providing a sheet-like element which forms a base element, at least one first intermediate element with a pre-cut line which delimits a disc containment seat, and a covering element with a pre-cut line which delimits the opening with a retaining edge, folding lines for mutual overlap being provided between said base, intermediate and covering elements; folding said at least one first intermediate element onto said base element, gluing the contact surface that is external to said containment seat; folding said covering element onto said at least one first element, gluing the entire mutual contact surface; trimming peripheral edges of said folded elements; removing portions delimited by said pre-cut lines in order to free said disc containment seat; and applying a containment cover.

BRIEF DESCRIPTION OF THE DRAWINGS

Further characteristics and advantages of the present invention will become apparent from the following detailed description of a preferred but not exclusive embodiment of a method for manufacturing cases for compact discs and the like, illustrated only by way of non-limitative example in the accompanying drawings, wherein:

FIG. 1 is a schematic perspective unfolded view of the sheet-like element used to provide the disc containment body;

FIG. 2 is a perspective view of the step for reinforcing the base element;

FIG. 3 is a perspective view of the step for folding the flaps that form the containment seat;

FIG. 4 is a perspective view of the step for superimposing the flaps that form the containment seat onto the base element;

FIG. 5 is a perspective view of the final step for folding the containment body;

FIG. 6 is a perspective view of the step for trimming the edges of the containment body;

FIG. 7 is a perspective view of the step for extracting the portions delimited by the pre-cut lines;

FIG. 8 is a schematic perspective view of the resulting containment body;

FIG. 9 is a perspective view of the containment body inserted in a cover.

DESCRIPTION OF THE PREFERRED EMBODIMENTS

With reference to the above figures, the method for manufacturing cases for compact discs and the like, according to the invention, consists in providing a sheet-like element 1 which is made of reduced-thickness cardboard.

The sheet-like element 1 forms a base element 2 which is flanked, on one side, by a base reinforcement element 3 which can be folded, as will become apparent hereinafter, onto the base element 2.

The base element is flanked, on the sides that are contiguous to the one affected by the base reinforcement element 3, by a first intermediate element 4 which is in turn flanked, on the opposite edge, by a second intermediate element 5.

Pre-cut lines 7 are formed in the intermediate elements 4 and 5 and delimit a containment seat for the disc, as will become apparent hereinafter; the pre-cut lines are constituted in practice by two mutually opposite circumferential portions 7a and 7b which end with end portions 8a and 8b which are arranged substantially at right angles to the edges along which the intermediate elements are laterally adjacent.

The base element 2 has, on the opposite edge with respect to the one to which the first intermediate element is laterally adjacent, a covering element 10 which has a pre-cut line 11 which duplicates, for a certain extent, the shape of the containment seat and has a portion 12 which forms a retaining edge which overlaps the seat.

Opposite the portion 12 there are provided two end portions 13 which are substantially parallel to the portions 8a and 8b.

Folding lines, all designated by the reference numeral 15, are provided between the mutually laterally adjacent elements and allow the mutual overlap of the various elements, as will become apparent hereinafter.

First of all, the base reinforcement element 3 is superimposed on the base element 2 by interposing an adhesive layer designated by the reference numeral 18.

Then the second intermediate element 5 is folded onto the first intermediate element 4 by interposing a layer of adhesive designated by the reference numeral 19.

The subsequent operation applies adhesive exclusively at the region that lies outside the containment region. The layer 20 allows in practice to mutually join the intermediate elements which are folded onto the base reinforcement element 3, preventing the bonding of the region delimited by the pre-cut lines.

The subsequent operation, as shown in FIG. 4, applies a layer of adhesive material between the covering element and the entire surface of the folded intermediate element, obtaining the component shown in FIG. 5.

The subsequent operation consists in trimming the peripheral edges of the various elements folded onto each other, in order to make the containment body 30 assume the typical dimensions of compact disc cases.

Once this operation has been performed, the portions delimited by the pre-cut lines are removed, bearing in mind that the end portions in practice are located at the edges of the containment body by means of the previously performed trimming operation.

Then the assembly of the portions that were delimited by the pre-cut lines is removed, thus forming the containment seat for the compact disc 31, which is accommodated in the seat 32 formed inside the various folded elements and is retained by the edge that was delimited by the pre-cut line 12, which overlaps the containment seat.

The provision of the containment body by means of a plurality of mutually folded layers allows to use, first of all, thinner layers with a thickness of less than 0.6 mm, preferably 0.4 mm, accordingly allowing to subject them to normal printing operations, and secondly allows to avoid the need to form the containment body by superimposing pieces, since coupling is provided by folding the sheet-like element, in which the portions that will constitute the containment seat are maintained as a stiffening element, extracting them only at the end of the operations for completing the containment body.

The containment body 30 is then applied, in a per se known manner, to a conventional cover 40 which covers the assembly.

From the above description it is thus evident that the invention achieves the intended aim and objects, and in particular the fact is stressed that a method is provided which allows to considerably simplify the production of cases for compact discs and the like and at the same time allows to shape the containment seat at will, providing thereon peripherally open regions for engagement with the finger for removing the disc, whereas on the opposite edge it is possible to keep the seat closed and still have the retaining edge overlap the entire peripheral portion of the disc that lies opposite the open region.

The invention thus conceived is susceptible of numerous modifications and variations, all of which are within the scope of the inventive concept.

All the details may also be replaced with other technically equivalent elements.

In practice, the materials employed, as well as the contingent shapes and dimensions, may be any according to requirements.

The disclosures in Italian Patent Application No. MI99A001013 from which this application claims priority are incorporated herein by reference.

What is claimed is:

1. A method for manufacturing cases for compact discs and the like, comprising the steps of: providing a sheet-like element which forms a base element, at least one first intermediate element with a pre-cut line which delimits a disc containment seat, and a covering element with a pre-cut line which delimits an opening with a retaining edge, folding lines for mutual overlap being provided between said base, first intermediate and covering elements; folding said at least one first intermediate element onto said base element, gluing the contact surface that is external to said containment seat; folding said covering element onto said at least one first element, gluing the entire mutual contact surface; trimming peripheral edges of said folded elements; removing the portions delimited by said pre-cut lines in order to free said disc containment seat; and applying a containment cover.

2. The method according to claim 1, wherein said sheet-like element has, laterally adjacent to said base element, a base reinforcement element which can be folded onto said base element and can be rigidly coupled thereto.

3. The method according to claim 1, wherein said sheet-like element comprises a first intermediate element and a second intermediate element which are mutually laterally adjacent and are provided with said pre-cut lines, said first and second intermediate elements being superimposable by mutual folding and rigidly associable over the entire contact surface.

4. The method according to claim 3, wherein said pre-cut lines comprise mutually opposite circumferential portions which end with end portions which are arranged substantially at right angles to the edges along which said intermediate elements are laterally adjacent, the trimming line affecting said end portions.

5. The method according to claim 3, wherein said covering element has a pre-cut line which is partly shaped so as to match said containment seat and partly forms a retaining edge which overlaps said seat, two end portions being provided opposite said portion and being arranged substantially parallel to end portions of the pre-cut lines of said intermediate elements.

6. The method according to claim 1, wherein said sheet-like element has a thickness of less than 0.6 mm for graphic printing thereof.

7. The method according to claim 6, wherein said sheet-like element has a thickness of 0.4 mm.

8. A case for compact discs, wherein said case is manufactured with the method according to claim 1.

* * * * *